Nov. 23, 1943.

D. E. BONNER 2,334,988

ELECTRIC MOTOR CONTROL SYSTEM

Original Filed May 3, 1939

INVENTOR
DOUGLAS E. BONNER
BY
ATTORNEY.

Patented Nov. 23, 1943

2,334,988

UNITED STATES PATENT OFFICE 2,334,988

ELECTRIC MOTOR CONTROL SYSTEM

Douglas E. Bonner, New York, N. Y.

Original application May 3, 1939, Serial No. 271,487. Divided and this application April 26, 1940, Serial No. 331,807

4 Claims. (Cl. 172—239)

My invention relates to electric motor control systems and has for its object the provision of an electrical control system arranged and operating in a novel manner to control the function of given means such as, for instance, the operation of an electric motor. Other specific objects will appear from the description hereinafter, and the features of novelty will be pointed out in the claims.

The instant application is a division of another application filed by me in the United States Patent Office on May 3, 1939, Serial No. 271,487, and issued on June 4, 1940, as Patent No. 2,203,251.

Figure 1:
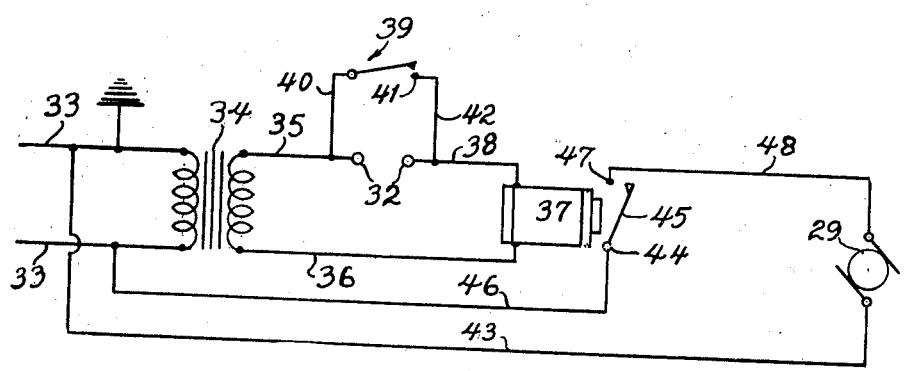
Figure 2:
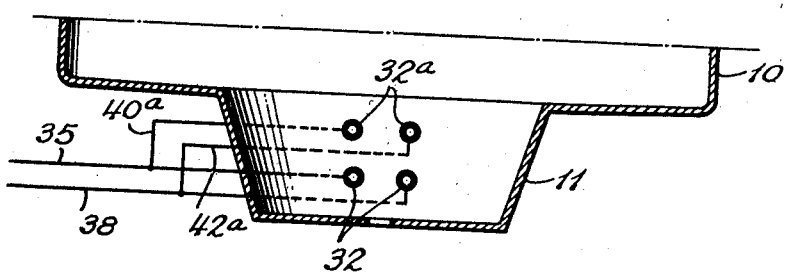

In the accompanying drawing, which illustrates examples of the invention, without defining its limits, Fig. 1 is a diagram showing an arrangement of electric circuits for the novel electrical control system, and Fig. 2 is a sectional view showing another arrangement of the electrical control system.

As shown in the drawing, the novel electrical control system includes spaced electrodes 32 which are arranged to be connected and disconnected by a rising and falling quantity of liquid, and accordingly may project into a sump 11 as shown in Fig. 2 and constitute terminals of an electric circuit which includes the electric motor 29; the electrical control of the motor 29 is effected by the liquid in the sump 11 in cooperation with said spaced electrodes 32 or in equivalent arrangements by liquid arranged to co-operate with similar electrodes in a corresponding manner.

In the systems shown in the drawing, these electrodes 32 are so located as to be positioned at predetermined points in the sump 11 or its equivalent so that the electric current must of necessity pass through the liquid when the motor is in operation, and unless prohibitively expensive insulation is provided to insulate the sump 11 or its equivalent, the possibility exists that persons coming in contact with the metal parts of the sump 11 or its equivalent may receive electric shocks during the operative periods of the motor 29. The average house current at present in use is around 110 volts; this would give a decidedly noticeable shock which, in some cases, might be serious. In addition, a current of this voltage can present an objectionable fire hazard.

It is therefore desirable to disassociate the grounded house current from the metal parts of the sump 11 or its equivalent. This is accomplished by means of the aforesaid novel electrical control means wherein the house current is arranged to produce another independent current by induction, which induced current is passed through the liquid in the sump 11 or its equivalent to operate a relay controlling the admission of the house service current to the motor 29.

Fig. 1 shows diagrammatically an example of the novel electrical equipment and wiring whereby the above indicated results are obtained and in which alternating electric current from a house service outlet is led through wires 33 to a transformer 34. The latter is connected by means of a wire 35 with one of the terminals 32 and by means of a wire 36 with one side of the coil of a relay 37, the other side of said coil being connected through a wire 38 with the other of said terminals 32. Means is provided for short circuiting or bridging the gap between the terminals 32 for the purpose to be more fully set forth hereinafter. In Fig. 1 the short circuiting means is manually controlled and comprises a momentary switch 39 from which a wire 40 leads to the wire 35 and which cooperates with a terminal 41 from which a wire 42 leads to the wire 38; in Fig. 2 the short circuiting means operates automatically and comprises two additional terminals 32ª projecting into the sump 11 in spaced superimposed relation to the terminals 32 or in any other relative relation thereto in other equivalent arrangements. The additional terminals 32ª are connected by means of wires 40ª and 42ª respectively with the respective wires 35 and 38. One of the wires 33 from the house line is connected with a wire 43 which leads to the motor 29, the other wire 33 from the house line leading to one end 44 of a relay armature 45, through a connecting wire 46. The armature 45 when attracted by the relay magnet contacts with the terminal or contact 47 of a wire 48 which leads to the motor 29, thereby admitting current to the latter.

The liquid which controls the electrodes 32 will be electrically grounded to earth while the machine of which the sump 11 or its equivalent may form a part is being filled for instance from a house water pipe or while being drained from said machine for instance into a house wastepipe or if said machine has a conducting metallic connection leading to earth. Hence, if the house service current were passed through the electrodes, for energizing the relay, instead of the secondary independent current I employ, a short circuit would occur if the machine happened to be plugged into the house electric line so the service line ground were on the side opposite the machine ground.

I have found that a relay wound with a coil of comparatively high resistance, properly arranged, will fail to function when the circuit is closed by clear water covering the electrodes 32 and yet will function as soon as the electrodes are bridged by a better conductor. The relay 37 is accordingly of the above-mentioned type, which will not close when the liquid between the electrodes is pure water. In such case the relay 37 may be closed, for instance by momentarily operating the switch 39 to bridge the gap between electrodes 32. The relay 37 responds instantly to the operation of the switch 39 and the motor 29 starts and both continue in operation until the sump 11 or its equivalent has finally drained and the electrodes 32 are no longer connected by liquid therein. The result of the aforesaid arrangement is that the machine in question may be positively started by actuating the momentary switch 39 and it stops positively because the residue clear water in the sump at the end of a given operation such as rinsing is just enough to keep the relay 37 functioning and when the electrodes 32 are clear of the liquid, or perhaps only partly submerged, the relay 37 is de-energized and permits the armature 45 to move away from the contact 47 to thereby break the electric circuit and stop the motor 29.

Obviously the novel result effected by the momentary switch 39 could be accomplished by other equivalent means. For instance, as shown in Fig. 8, the momentary switch 39 could be replaced by the addition of the current supplied through additional electrodes 32ª located in a higher or in any selected part of the sump 11 or its equivalent where said additional electrodes 32ª would come in contact with liquid therein and thereby increase the current admitted to the relay 37 to energize said relay sufficiently to cause its armature 45 to close. Such an alternative and equivalent arrangement is shown diagrammatically in Fig. 2.

Pure water, a comparatively poor electrical conductor, can be made a much better conductor by the addition of small quantities of various substances, such for instance as salt. With the arrangement described above, positive cut-off of the motor can be provided even though the water happens to be a comparatively good conductor at the end of the machine's operation, and even though small particles of this water remain bridging electrodes and permitting the passage of a very small amount of current. This is accomplished by designing the relay so the armature will break well before its energizing current falls to the maximum that will pass between electrodes 32 when small particles of comparatively high conductivity, residual water bridge the electrodes 32. With this very desirable arrangement the introduction of additional current by means of the momentary switch 39, or by the additional electrodes 32ª referred to above, is necessary to energize the relay 37 sufficiently to close its armature 45 and start the motor.

Referring to Fig. 2 and the substitution of electrodes 32ª for the momentary switch 39, the operation is as follows: When liquid admitted to the machine mentioned rises in the sump 11 high enough to cover electrodes 32 but not high enough to reach electrodes 32ª, the current passed through electrodes 32 is insufficient to cause the closing of relay armature 45 and just enough to keep this armature closed once it is closed by the admission of more current to the relay coil 37. When this liquid rises higher, and high enough to even partly cover electrodes 32ª, there is passed through them to the relay coil 37 the necessary additional current to close relay armature 45 and operate the motor 29. By arranging electrodes 32 so they must be almost entirely submerged by liquid to prevent the relay armature 45 from breaking, small amounts of residual liquid, or solids, which may remain bridging electrodes 32, at the end of a given operation, will not pass enough current between electrodes 32 to prevent the relay armature 45 from opening and the motor 29 from stopping.

From the above it is evident that the application of these novel arrangements is not limited to any particular type of machines, and that they can be advantageously employed in other fields and devices.

The operation of the system is as follows: Through a hose connected with a water faucet, or otherwise, water is passed into the aforesaid machine and into the bottom of the sump 11 until said liquid submerges the electrodes 32. The current passing across electrodes 32 being insufficient to energize the relay 37 enough to close its armature 45, momentary switch 39 is then operated and this energizes the relay sufficiently to shift the armature 45 into engagement with the contact 47 and cause the motor 29 to operate. From this stage on, the operation of the system is entirely automatic.

When the water has drained out of the machine to the extent that the water in the sump 11 or its equivalent recedes so as to expose electrodes 32, the electric circuit to the coil of the relay 37 is broken, the relay armature opens and the motor 29 stops automatically.

Various changes in the specific forms shown and described may be made within the scope of the claims without departing from the spirit of the invention.

I claim:

1. Means for controlling an electric motor comprising an initial source of electric current arranged in a first circuit with the motor, a second circuit arranged to receive electric current by induction from the initial source of electric current through the first circuit, a circuit breaker arranged in series in the first circuit to open and close same and to be actuated by current in the second circuit, and a pair of stationary terminals insulated from each other arranged in series in the second circuit and arranged to be electrically connected by a relatively rising quantity of liquid coming into contact therewith to thereby close the second circuit, close the circuit breaker and operate the motor.

2. The combination of an electric motor, a source of electric current arranged in a first circuit, one side of which is grounded to the earth, said circuit being arranged to deliver current for the operation of said electric motor and to induce electric current in a second circuit for the operation of a circuit breaker controlling the operation of the motor, said second circuit being free from grounding with the earth and having a stationary break therein adapted to be automatically closed and opened by a relatively moving quantity of liquid.

3. In a motor control, the combination of a motor operated by an electric current arranged in a first circuit one side of which is earth grounded, a second and induced electric current in a circuit which is not earth grounded, and a circuit breaker arranged to be actuated by the second current to control said first circuit, the circuit of said second current being arranged to be controlled by earth grounded liquid.

4. In a means for automatically controlling the closing and opening of an earth grounded electrical circuit by means of a rising and falling quantity of liquid, the combination of a circuit breaker arranged to open and close said circuit, a second electrical circuit, a transformer adapted to be energized by electric current in said second circuit, a third electrical circuit induced by said transformer and free from earth ground and arranged to close said circuit breaker, and a pair of stationary terminals arranged in series in the third circuit normally insulated from each other and adapted to be electrically connected when the quantity of liquid rises into contact therewith to thereby close the third circuit and cause the transformer to introduce current into the third circuit and cause the circuit breaker to close the first circuit.

DOUGLAS E. BONNER.